United States Patent
Hrapsky

(10) Patent No.: US 12,415,207 B2
(45) Date of Patent: Sep. 16, 2025

(54) APPARATUS FOR DELIVERY ITEM SORTING INTEGRITY

(71) Applicant: United States Postal Service, Washington, DC (US)

(72) Inventor: Ryan J. Hrapsky, Arlington, VA (US)

(73) Assignee: UNITED STATES POSTAL SERVICE, Washington, DC (US)

(*) Notice: Subject to any disclaimer, the term of this patent is extended or adjusted under 35 U.S.C. 154(b) by 85 days.

(21) Appl. No.: 18/470,566

(22) Filed: Sep. 20, 2023

(65) Prior Publication Data

US 2024/0109733 A1 Apr. 4, 2024

Related U.S. Application Data

(60) Provisional application No. 63/580,743, filed on Sep. 6, 2023, provisional application No. 63/411,845, filed on Sep. 30, 2022.

(51) Int. Cl.
*B07C 3/00* (2006.01)
*B07C 3/08* (2006.01)
*B65G 47/88* (2006.01)
*B65H 9/04* (2006.01)

(52) U.S. Cl.
CPC .............. *B07C 3/008* (2013.01); *B07C 3/08* (2013.01); *B65G 47/883* (2013.01); *B65H 9/04* (2013.01); *B65G 2201/0285* (2013.01); *B65G 2205/06* (2013.01)

(58) Field of Classification Search
CPC .............. B65G 47/883; B65G 47/8853; B65G 2201/0285; B65G 2205/06; B07C 1/06; B07C 1/18; B07C 3/008; B07C 3/08; B65H 9/04; B65H 31/06; B65H 9/29
See application file for complete search history.

(56) References Cited

U.S. PATENT DOCUMENTS

| | | | | |
|---|---|---|---|---|
| 1,569,358 | A * | 1/1926 | Cross | A47B 61/00 403/205 |
| 2,474,172 | A * | 6/1949 | Tinnerman | F16B 2/245 403/252 |
| 4,019,730 | A * | 4/1977 | Staudinger | B65H 31/06 414/788.9 |
| 5,340,099 | A * | 8/1994 | Romanenko | B65H 29/52 271/305 |
| 6,880,823 | B2 * | 4/2005 | Itoh | B65H 31/06 271/220 |
| 7,344,134 | B1 * | 3/2008 | Keane | B65H 31/06 271/181 |
| 10,196,225 | B2 * | 2/2019 | Ohtake | B07C 3/008 |
| 2021/0229930 | A1 * | 7/2021 | Potter | B65H 29/68 |

* cited by examiner

*Primary Examiner* — Gene O Crawford
*Assistant Examiner* — Keith R Campbell
(74) *Attorney, Agent, or Firm* — MH2 Technology Law Group, LLP

(57) ABSTRACT

An apparatus that substantially improves the stack quality of delivery items in a delivery item sorting machine by ensuring uniformity of the orientation of the delivery items. The apparatus accommodates toolless installation in the delivery item sorting machine and economical manufacturing options. The apparatus substantially prevents delivery item disorientation and undesired departure of delivery items from the sorting machine. The apparatus reduces operator safety concerns, and increases the net speed of delivery item processing.

20 Claims, 21 Drawing Sheets

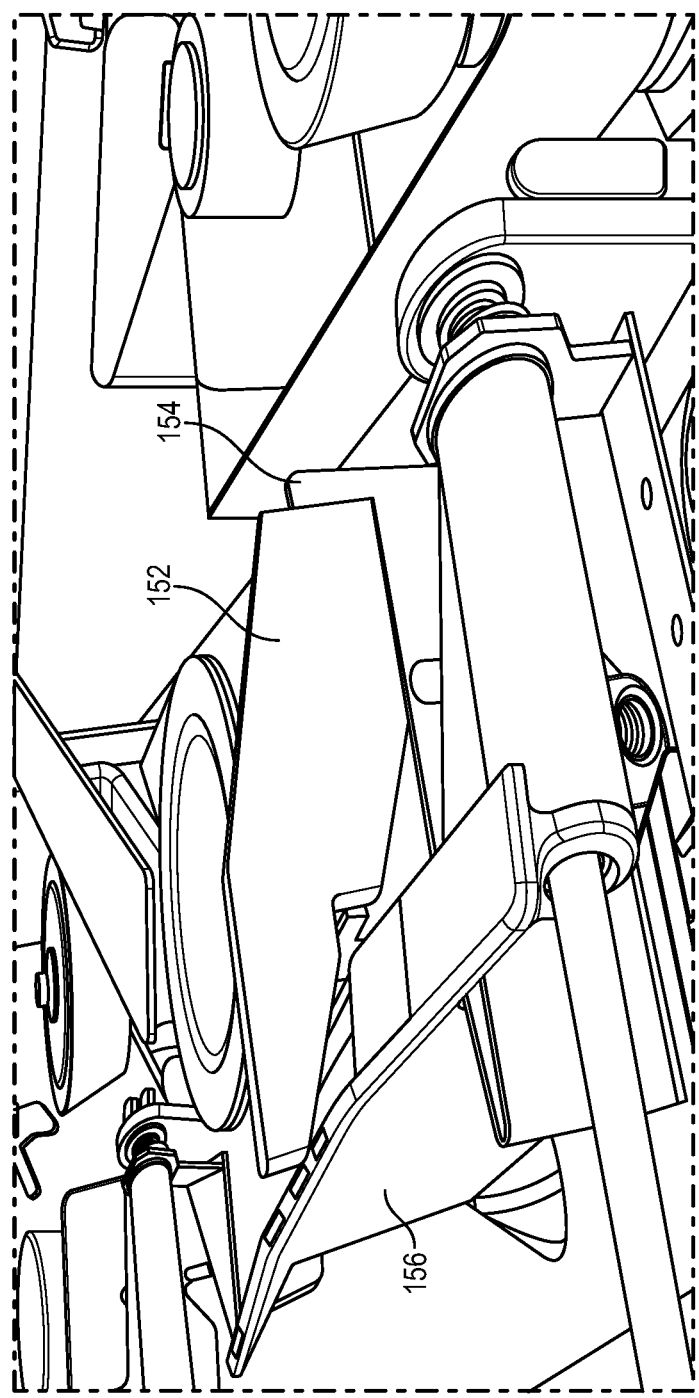

SECTION A-A

SECTION B-B

APPARATUS FOR DELIVERY ITEM SORTING INTEGRITY

CROSS REFERENCE TO RELATED APPLICATIONS

This application claims the benefits of U.S. Provisional Application No. 63/580,743, filed on Sep. 6, 2023, and of U.S. Provisional Application No. 63/411,845, filed on Sep. 30, 2022, both of which are incorporated by reference in their entireties.

BACKGROUND

Delivery items, such as envelopes, books, packages, flats, and the like, can be distributed and sorted using a variety of different devices. For example, delivery items can be routed through a sorting machine (e.g., a letter/envelope mail sorting machine or the like) to destination output bins. In some examples, the delivery items are routed based on data, such as sort plan data, which indicates whether an actuator is to move a diverter to force or direct delivery items into particular output bins of the sorting machine. In some examples, the delivery items can be traveling at 4 meters per second, or any other suitable speed. The various belts of the sorting machine can be timed so that each of the belts are travelling at 4 meters per second. This can result in the delivery items entering the output bin at the same speed (e.g., 4 m/s) as the belts are moving, which can give them a large amount of momentum. The various belts and other components typically direct the delivery items into the metal side or backstop of an output bin, which stops the delivery items. In some embodiments, the backstop or bin side may be covered by a bumper pad that the delivery items hit instead of the metal component that forms the bin's backstop or side.

However, differences in the size, weight, and materials/coatings of various delivery items (e.g., letters, post cards, etc.) causes difficulties with obtaining a repeatable uniform stack in the output bin. In particular, the different momentums and sizes of the delivery items relative to the height of the backstop or bin side can cause the delivery items to skew and change orientations with respect to each other when the delivery items strike the backstop or side of the bin, which results in a stack of delivery items with unaligned edges. In some cases, a delivery item may become so misoriented that it "flies" out of the sorted stack in the output bin and lands somewhere unintended in or near the sorting machine. When the stacks of delivery items in an output bin become misoriented, clerks must reach into the bin of the sorting machine and physically pat the delivery items down until they are properly and uniformly stacked or aligned before "sweeping" or taking the stack of sorted delivery items out of the output bins. This requirement adds significant time to the sweeping operation, and poses a safety risk as clerks are often putting their hands near the moving belts/pulleys of the sorting machine. There are an estimated 2,773 in-service sorting machines for which misorientation is an issue. The sorting machines include, but are not limited to including, delivery bar code sorter (DBCS) configurations CJ, CI, CK, and AB, and delivery barcode sorter input/output subsystem (DIOSS) configurations B and E.

Current systems lack the stack quality for delivery items, and do not ensure uniformity of the orientation of the delivery items. Current systems lack non-intrusive installation and economical manufacturing options. Current systems cannot prevent delivery item disorientation and undesired departure of delivery items from the sorting stack and/or the sorting machine. Current systems do not reduce operator safety concerns, and increase the net speed of delivery item processing.

SUMMARY

The foregoing and/or other aspects and utilities embodied in the present disclosure may be achieved by providing a sorting machine for delivery items, such as envelopes, etc., wherein the sorting machine includes an output bin that includes a transport belt to transport a delivery item from a distribution belt along a friction belt up to a back stop. The apparatus of the present teachings is coupled with the sorting machine, and provides a backstop for the delivery items to encounter before feeding into an output bin, the delivery items entering the bin being positionally oriented in alignment with the delivery items already in the bin.

One general aspect includes a sorting machine apparatus for orienting delivery items. The sorting machine apparatus also includes a bumper. The apparatus also includes a coupling feature connected to the bumper. The apparatus also includes where the coupling feature operably couples the sorting machine apparatus with a sorting machine such that the bumper is positioned to align with an upper portion of a moving delivery item that comes to rest after impacting the bumper.

Implementations may include one or more of the following features. The sorting machine apparatus where the bumper and the coupling feature may include a single structure. The coupling feature may include a clip. The clip may include a semi-rigid arm having a first end and a second end, the first end being substantially curved, and a rigid wall operably coupled with the semi-rigid arm at the first end. The rigid wall may include a lip. The semi-rigid arm may include a mitre fillet. The coupling feature may include a set screw. The sorting machine apparatus may include a metal material. The sorting machine apparatus may include a plastic material. The sorting machine apparatus may include: a tab operably coupled with the bumper, the tab extending from a lower edge of the bumper. The bumper includes an angled feature that is configured to guide a paddle away from the sorting machine apparatus.

One general aspect includes a delivery item sorting machine apparatus coupled with a delivery item sorting machine. The delivery item sorting machine apparatus also includes a bumper configured with a spatial extension to the output bin. The apparatus also includes a coupling feature operably securely coupling the bumper with the output bin. The apparatus also includes where the bumper is configured to reduce or eliminate rotation, skewing, misaligning, and flying out of the at least one delivery item with respect to the output bin.

Implementations may include one or more of the following features. The delivery item sorting machine apparatus may include a paddle operating cooperatively with the bumper, the paddle and the bumper bounding the at least one delivery item on two sides as the at least one delivery item is directed into the output bin. The delivery item sorting machine apparatus may include a backstop operably coupled with the output bin, and an attachment device configured to create a secure coupling the bumper with the backstop. The attachment device may include a semi-rigid arm, and a rigid wall operably coupled with the semi-rigid arm at a first intersection between the semi-rigid arm and the rigid wall, the rigid wall and the semi-rigid arm forming a channel at a second intersection between the semi-rigid arm and the rigid wall, where the channel includes a shape accommodating the secure coupling between the bumper and the output bin. The rigid wall may include a lip extending towards the semi-rigid arm, the lip being configured to prevent the bumper from becoming disengaged from the output bin. The semi-rigid arm may include: a fillet extending away from the rigid wall, the fillet configured to aid in installation and removal of the bumper. The spatial extension may include a height extension. The bumper may include a dampening pad configured to reduce a force transmitted as the at least one delivery item contacts the bumper. The coupling feature may include at least one of a bolt, a magnet, a rivet, a pin, an adhesive, and hook-and-eye material.

This summary is intended to introduce a simplified encapsulation of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is to present one or more concepts in simplified form as a prelude to the detailed description below. Further areas of applicability of the present disclosure will become apparent from the detailed description provided hereinafter. It should be understood that the detailed description and specific examples, while indicating some typical aspects of the disclosure, are intended for purposes of illustration only and are not intended to limit the scope of the disclosure.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 2D is a left side view of the first exemplary device installed in the sorting machine of FIG. 1A, according to one or more implementations disclosed;

DETAILED DESCRIPTION

Figure 1A:
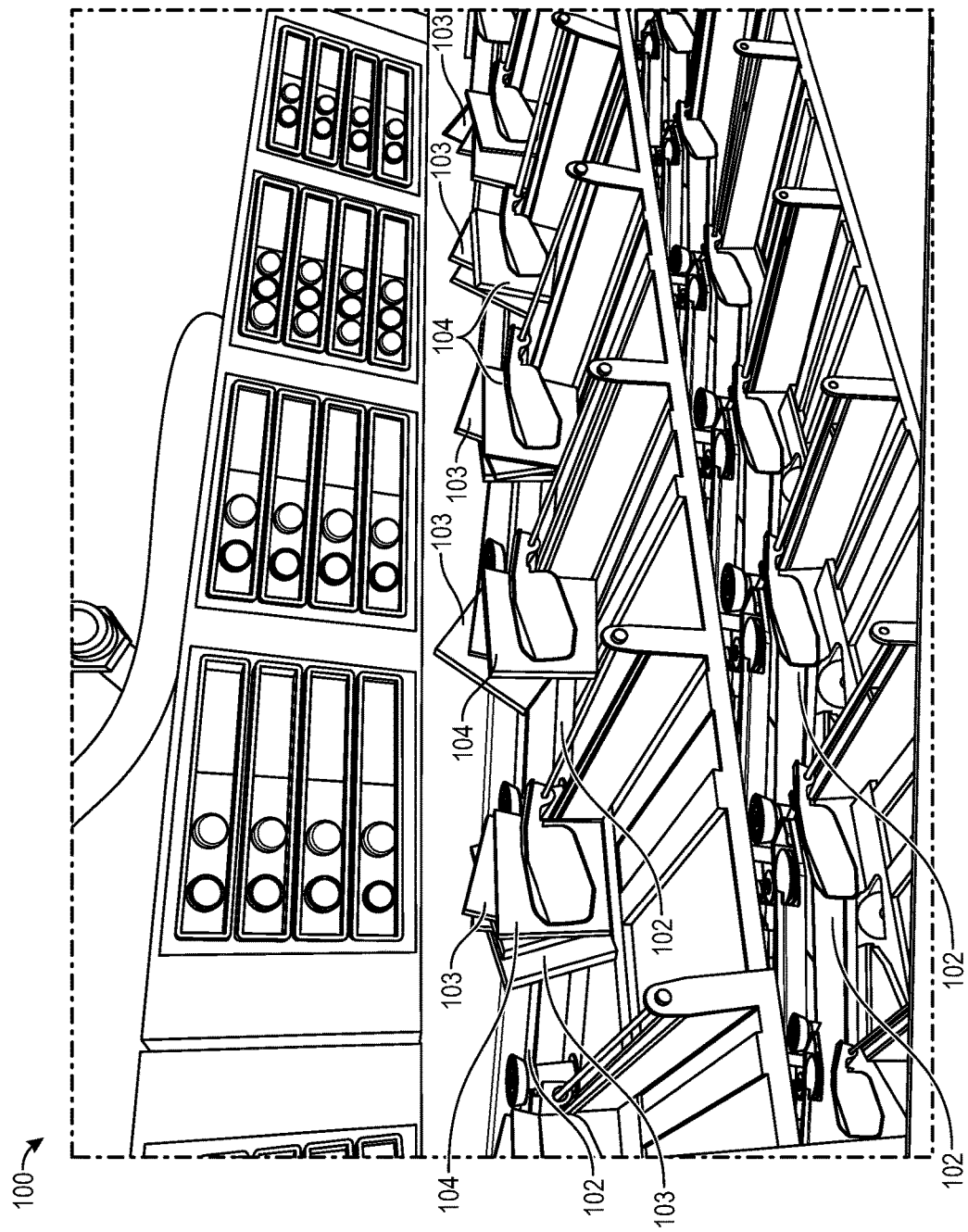
FIG. 1A (PRIOR ART) is a front view of a portion of a conventional sorting machine, including output bins, according to the prior art.

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

The following description of various typical aspect(s) is merely descriptive in nature and is in no way intended to limit the disclosure, its application, or uses. As used throughout this disclosure, ranges are used as shorthand for describing each and every value that is within the range. It should be appreciated and understood that the description in a range format is merely for convenience and brevity, and should not be construed as an inflexible limitation on the scope of any embodiments or implementations disclosed herein. Accordingly, the disclosed range should be construed to have specifically disclosed all the possible subranges as well as individual numerical values within that range. As such, any value within the range may be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive) of that numeral, ±0.1% (inclusive) of that numeral, ±0.5% (inclusive) of that numeral, ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

Referring now to FIG. 1A (PRIOR ART), a front perspective view of a portion of a conventional sorting machine 100, including some of its output bins 102, is shown. The sorting machine 100 includes any suitable number of output bins 102 that collect sorted delivery items 103, 104, such as envelopes, postcards, and the like. In some embodiments, the delivery items 103, 104 are transported along a series of high-speed belts (not depicted) that are located behind each of the output bins 102. The delivery items 103, 104 include magazines, catalogs, letters, mail pieces, and the like.

Continuing to refer to FIG. 1A (PRIOR ART), in some embodiments, diverters (not depicted) are proximate to a series of high-speed belts and each diverter can direct, reroute, or place the delivery items 103, 104 into separate bins 102. The output bins 102 are designed to collect and hold delivery items 103, 104. For example, the output bins 102 can each collect a row or stack of delivery items 103,104 as the delivery items are diverted into each of the output bins 102. As illustrated in FIG. 1A (PRIOR ART), conventional sorting machines 100 direct and transport delivery items 103, 104 directly from the high-speed belt into the output bins 102, without significantly slowing the delivery items 103, 104 before they hit the backstops or the sides of the output bins 102. As a result of the high-speed impact, (such as about 3.0 m/s, 3.7 m/s, 4 m/s, or higher), with the backstops and/or sides of the output bins, some of the delivery items 103 become skewed, crooked, and/OR unaligned with respect to each output bin and each other, forming a stack or row wherein several delivery items 103 are generally, and often substantially, unaligned with the other delivery items 104 in the stack or row, as shown in FIG. 1A (PRIOR ART). This is a very common problem for delivery items that are taller than the height of the backstop/side of the output bin upon which they impact (e.g., delivery items that are taller than 11 cm, such as delivery items that are from 12 cm to 24 cm tall, or taller), such as delivery items 103. This occurs because there is nothing to decelerate or stop the upper portion of a tall delivery item, and the momentum of the upper portion of a tall delivery item tends to rotate the delivery item around the upper edge of the backstop/side of the output bin upon impact with the backstop/side. In FIG. 1A (PRIOR ART), this can be seen, for example, with regard to the delivery items 103, which are rotated or otherwise skewed or misaligned with respect to the delivery items 104, which are substantially in line with or parallel to the sides and the bottom of the bins 102. In some cases (not shown in FIG. 1A), a taller-than-the backstop delivery item 103 (e.g., a letter, a postcard, etc.) may rotate or otherwise become skewed to such a large extent upon impact with the backstop that it flies out of the stack or row of delivery items 103, 104 in the bin 102. Such "flying" delivery items must be handled manually by a person, which greatly slows and reduces the efficiency of the sorting operation. It is to be understood that the conventional sorting machine 100 of FIG. 1A (PRIOR ART) is included for illustrative purposes only. The conventional sorting machine 100 can include a suitable number of output bins 102 arranged in any suitable number of rows and/or columns.

Figure 1B:
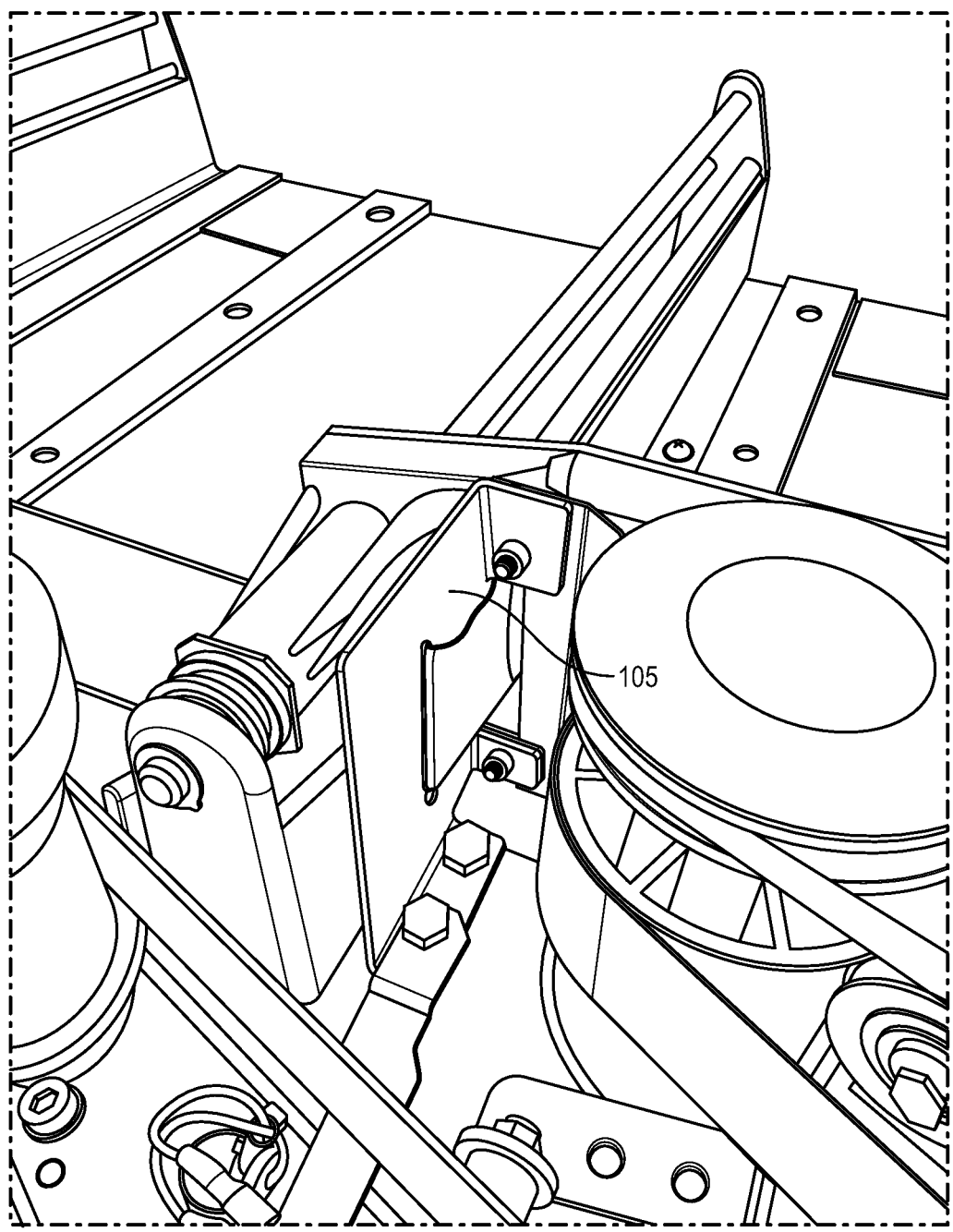
FIG. 1B (PRIOR ART) is a perspective view of an exemplary mounting location, within the sorting machine of FIG. 1A, of the exemplary device according to one or more implementations disclosed.

Referring now to FIG. 1B (PRIOR ART), shown is an exemplary feature 105 of the standard sorting machine upon which the device of the present teachings can be mounted. The position of the feature 105 with respect to the backstop and bin 102 (FIG. 1A (PRIOR ART)), and the thickness of the feature 105 lends itself to be an appropriate mounting point for the device of the present teachings. However, the device of the present teachings can be mounted elsewhere on the conventional sorting machine 100 (FIG. 1A (PRIOR ART)). The size and shape of the device of the present teachings can be adjusted to accommodate other mounting points on the conventional sorting machine 100. Thus, the present teachings contemplate that the exemplary device described herein can undergo redesign and still fall within the scope of the present description. Various embodiments of the devices and techniques described herein may be advantageously added to a conventional sorting machine, reducing or eliminating the rotation, skewing, misaligning, and/or "flying" of delivery items 103, improving the sorting machine's output capabilities, and improving the efficiency of the sorting process.

Figure 2A:
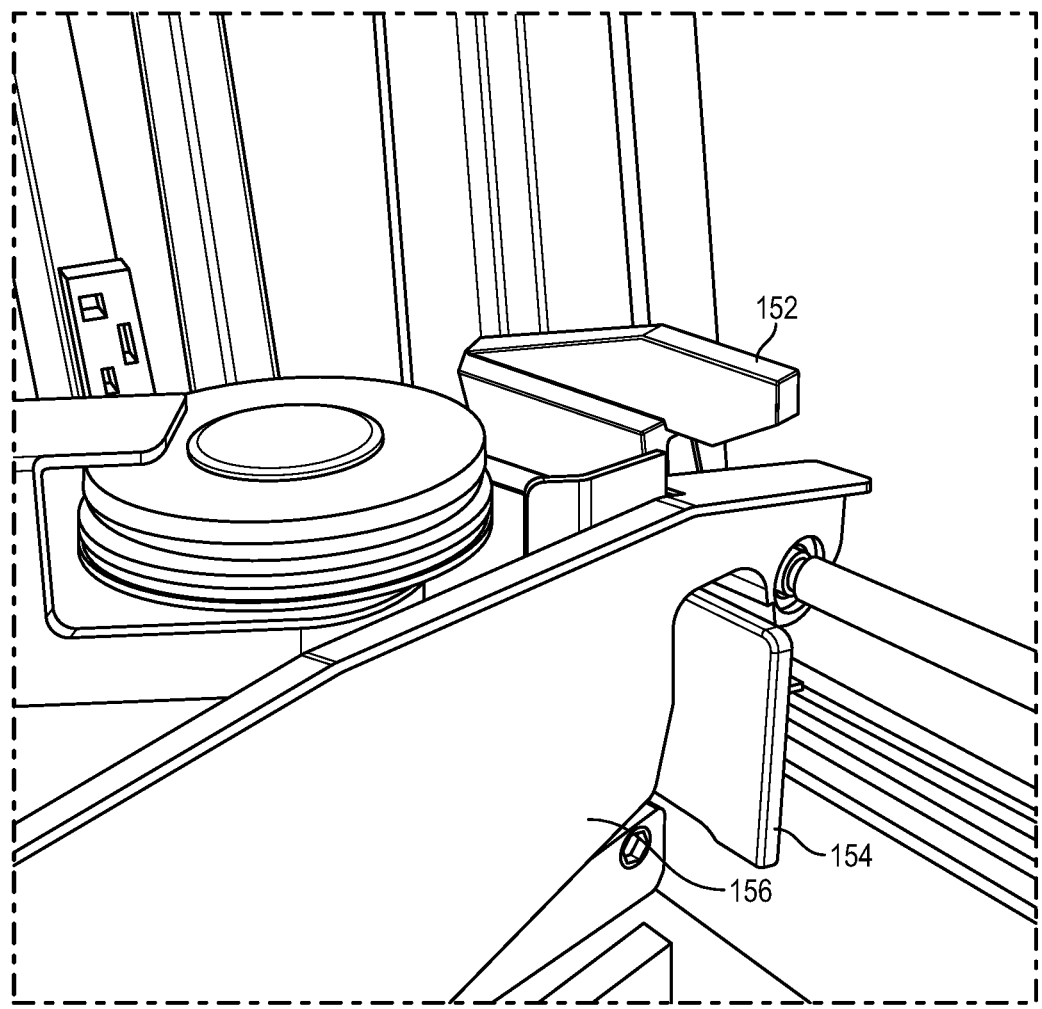
FIG. 2A is a right side perspective view of a first exemplary device, installed in the sorting machine of FIG. 1A, according to one or more implementations disclosed.
Figure 2B:
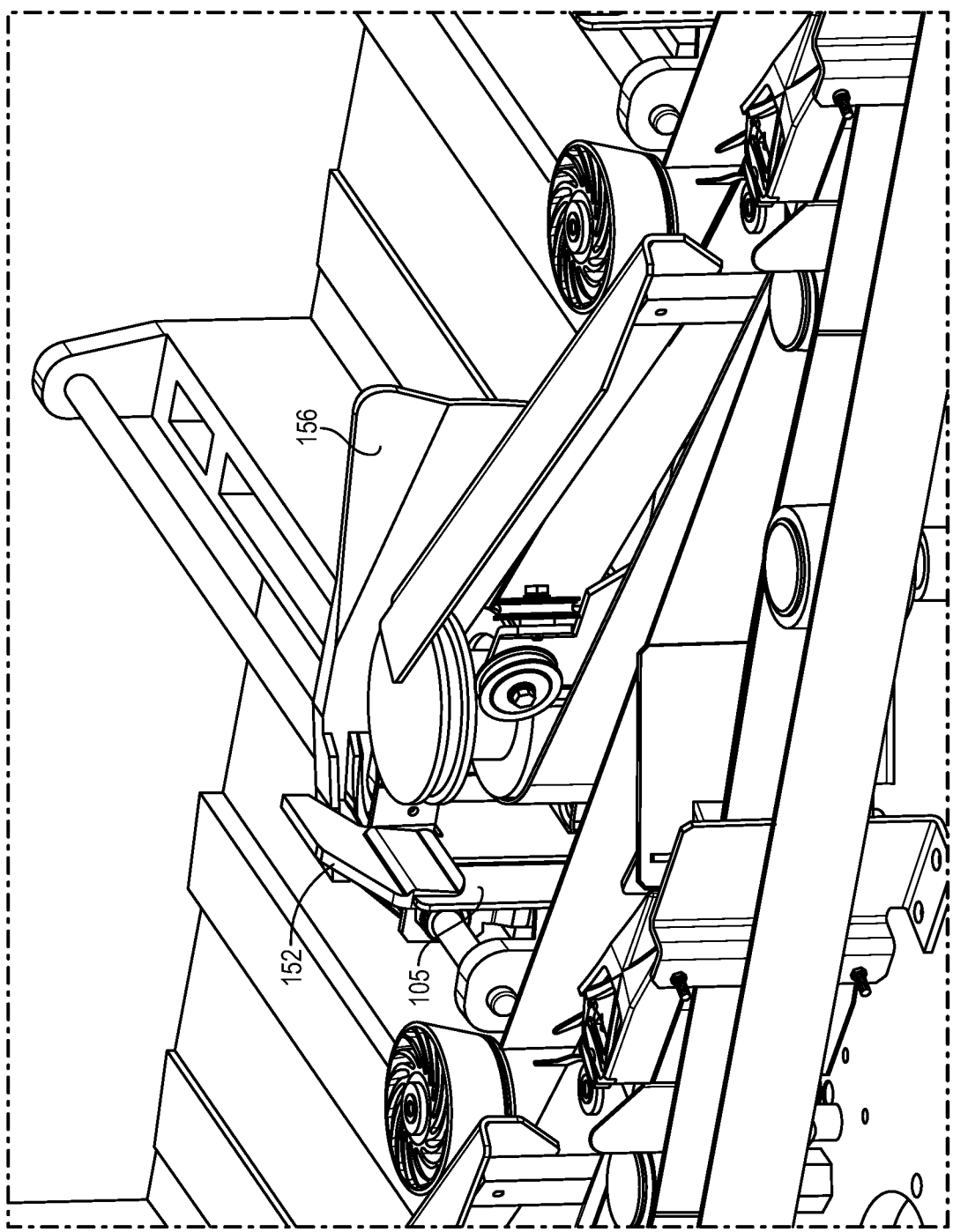
FIG. 2B is a right rear view of the first exemplary device installed in the sorting machine of FIG. 1A, according to one or more implementations disclosed.
Figure 2C:
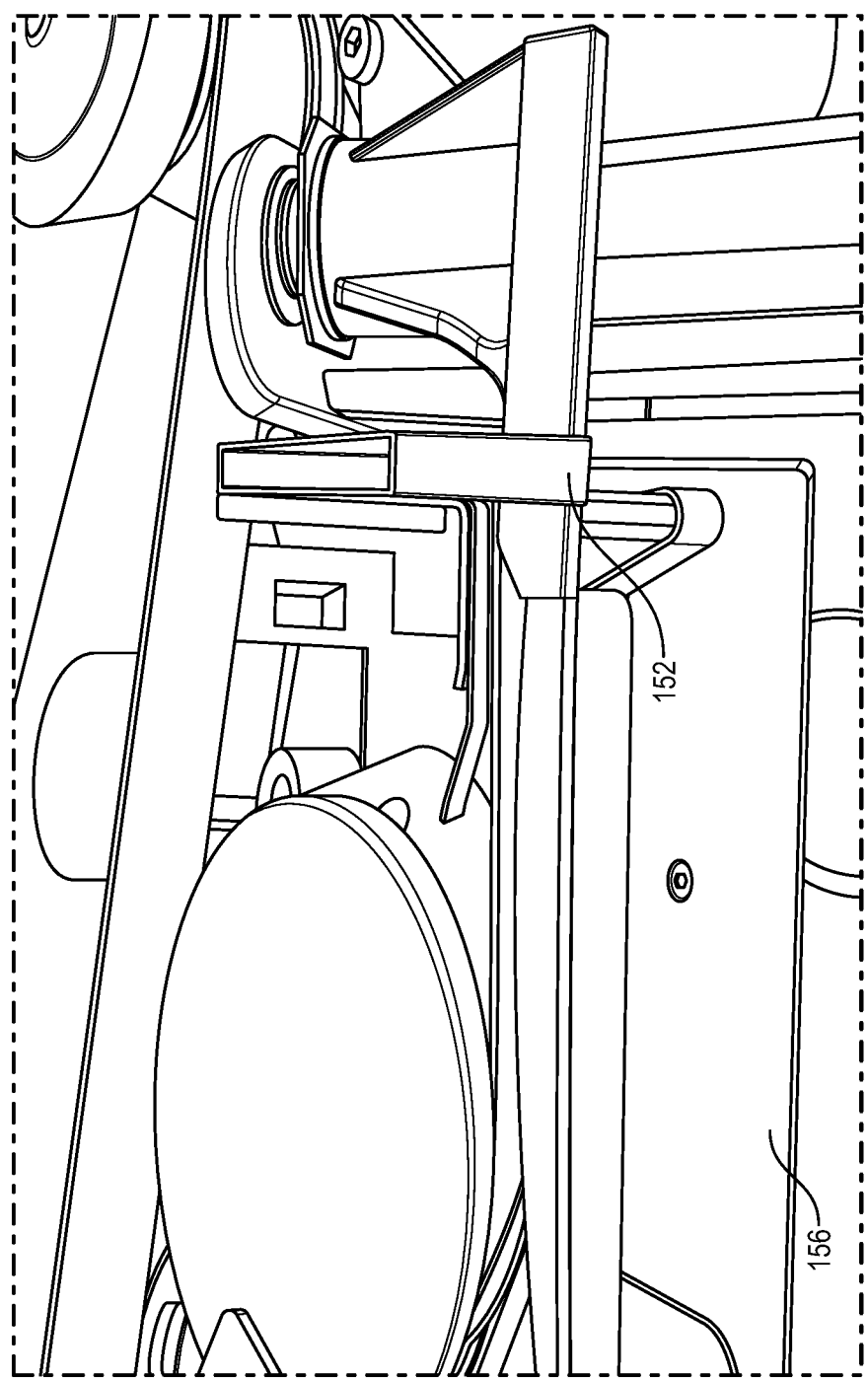
FIG. 2C is a rear view of the first exemplary device installed in the sorting machine of FIG. 1A, according to one or more implementations disclosed.

Referring now to FIGS. 2A-2F, shown is a device that illustrates, for exemplary purposes only, a first configuration of the apparatus 152 of the present teachings, operably coupled with a sorting machine for example, upon a mounting feature 105. The apparatus 152 includes a height-extended bumper and a coupling feature. In use, the apparatus 152 is operably coupled with the sorting machine in proximity to an existing backstop or wall of an output bin 102. Specifically, apparatus 152 is operably coupled to assist a conventional backstop 154 and paddle 156 in capturing delivery items as they are sorted. Without apparatus 152, the travel of the lower portion of the delivery items is stopped by conventional backstop 154, while the travel of the upper portion of the delivery items that are taller than the backstop 154 (e.g., taller than about 11 cm) can continue travel beyond the bin 102 due to inertia; for example, the delivery items may rotate with respect to the upper edge of the backstop 154, or otherwise become skewed with respect to the backstop 154. Such rotation or skewing results in non-uniform orientation of the delivery items within the bin 102 (e.g., as shown for delivery items 103 and 104 in FIG. 1A (PRIOR ART)), or the non-entry of the delivery items into the sorted stack that is formed in the bin 102, among other problems. The apparatus 152, in contrast, provides a stopping surface for the upper portion of the delivery items that are taller than the backstop 154, which prevents those delivery items from rotating or otherwise skewing, thus reducing or eliminating both non-uniform orientation of the delivery items in the stack formed in the bin 102 and "flyer" delivery items that come out of the stack in the bin 102. The present teachings contemplate other configurations such as, for example, but not limited to, the conventional backstop 154 can be absent altogether and the apparatus 152 can be coupled to any appropriate feature of the sorting machine, such as the side of the output bin 102. Further, the paddle 156 can be any size or shape. As shown in the example of FIG. 2A, in an exemplary configuration, the apparatus 152 and paddle 156 are preferably positioned to operate cooperatively so that delivery items are bounded on two sides as they are directed into the output bin.

Figure 2E:
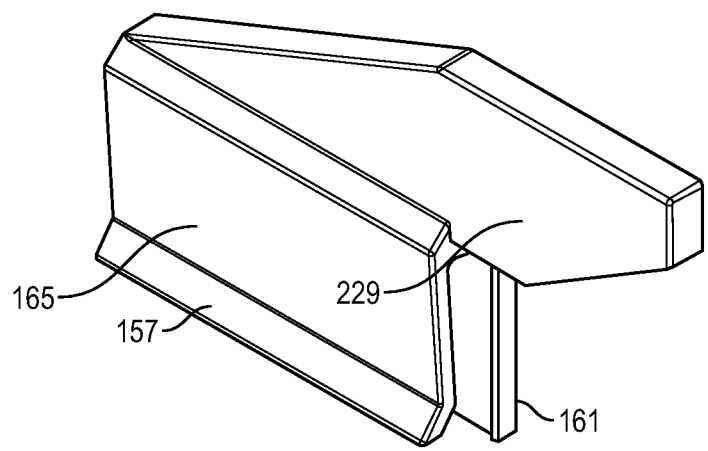
FIG. 2E shows a right side perspective view, a side view, and a front view of the first exemplary device, according to one or more implementations disclosed.
Figure 2E:
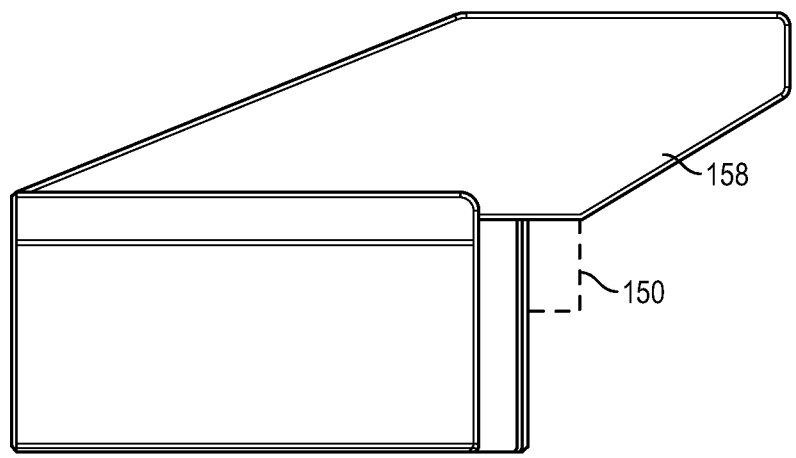
Figure 2E:
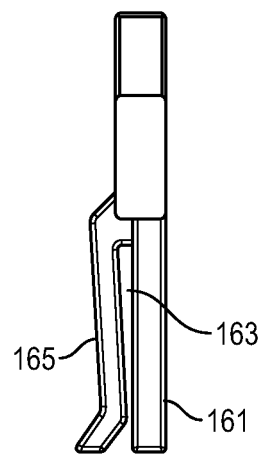

Referring now to FIG. 2E, a first exemplary configuration of the apparatus 152, is shown in isolation from a sorting machine. As described herein, the apparatus 152 includes a coupling feature and a height-extended bumper 229. In some configurations, the apparatus 152 is 3D printed. In some configurations, the apparatus 152 is injection molded to accommodate high production. In some configurations, the apparatus 152 can be made of metal, for example, aluminum or steel, for added strength and lifespan. A dampening pad, for example, made of foam rubber or the like, can be applied to the face of the apparatus 152 upon which delivery items impact to aid with the reduction of force transmitted as the delivery items make contact. In the exemplary configuration of the apparatus 152, the coupling feature is a clip-shaped combination of the semi-rigid arm 165 opposing the rigid wall 161. The semi-rigid arm 165 and the rigid wall 161 form the cavity 163 that is shaped to accommodate a feature of the sorting machine upon which the apparatus 152 is mounted. In an embodiment, the mounting feature includes an existing backstop 154 (FIG. 2D), or a portion of the backstop 154 (FIG. 2D) that is behind a belt or pulley, for example. The coupling feature can accommodate a variety of thicknesses of the mounting feature, such as a thickness ranging from about 0.5 mm to 7.0 mm. In some embodiments, the rigid wall 161 includes a mitre filet 157 that protrudes slightly (e.g., from 0.3 mm to 3.0 mm) into the cavity 163, which prevents the apparatus 152 from becoming dislodged from the mounting feature. For example, the mitre filet 157 may engage with the edge of the mounting feature and prevent the apparatus 152 from sliding in a direction away from the paddle 156 (FIG. 2A). It is possible that if the apparatus 152 becomes dislodged, it could fall into the sorting machine works, possibly causing damage to the sorting machine. In some configurations, the mitre filet 157 can aid in installation and removal of the apparatus 152. Specifically, the mitre filet 157 can be used to engage and guide the edge of the mounting feature into the cavity 163 during installation, and it can be gripped or pulled by fingers and used to urge the semi-rigid arm 165 away from the rigid wall 161 during removal, thus toollessly installing and releasing the apparatus 152 from the mounting feature.

Figure 2F:
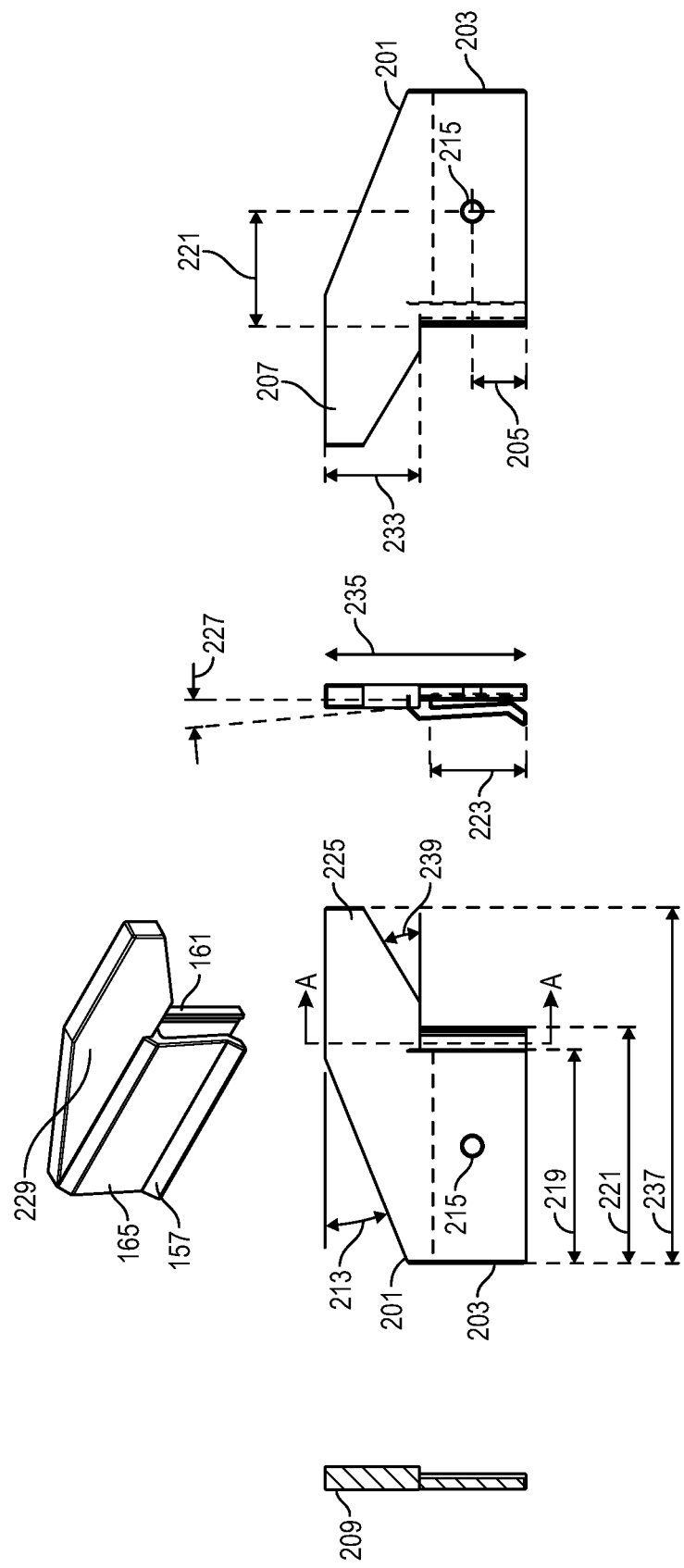
FIG. 2F shows a right side perspective view, a side view, and a front view of the first exemplary device with exemplary dimensions, according to one or more implementations disclosed.

Continuing to refer to the example shown in FIG. 2E, the coupling feature is not required to be clip-shaped. In various embodiments, the apparatus 152 may include any coupling feature that can enable an operable coupling with the mounting feature by making a firm mechanical connection. Some embodiments may include an attachment feature such as a set screw, which may be inserted in the recess 215 (FIG. 2F). Whether the apparatus 152 includes a clip-shaped coupling feature or not, other attachment mechanisms are contemplated by the present teachings. In some embodiments, the apparatus 152 can be attached to the mounting feature by, for example, but not limited to, a bolt, a magnet, a rivet, a pin, an adhesive, or a hook-and-eye material, among other things.

Continuing to refer to FIG. 2E, the apparatus 152 includes a height-extended bumper 229. The bumper 229 can optionally be shaped to accommodate the paddle 156 (FIG. 2A). Specifically, during maintenance activities of a pocket, an operator may move the paddle 156 clockwise up and out of the way to perform the maintenance activities. Angled feature 158 helps prevent the apparatus 152 from moving or popping out of position when the paddle 156 is pulled up. In particular, if the operator rotates the paddle 156 clockwise and up while the paddle 156 is under the bumper 229, then the angled feature 158 guides the paddle 156 along its slope and away from the apparatus 152. In various embodiments, the profile of the bumper 229 may be optimized based on the geometry of the sorting machine, and the arrangement of the bins and paddles. For example, the bumper 229 could be taller to accommodate or function with taller delivery items. In another example, in some embodiments the bumper 229 may include a tab 150 that provides an additional lower surface upon which less tall delivery items might impact. In various such embodiments, the tab 150 may extend from about 5 mm to about 50 mm below the main area of the bumper 229. For another example, in sorting machines where the paddle 156 is not proximal to the bumper 229, the bumper 229 may not include the angled feature 158. In yet another example, the angled feature 158 could be squared off or provided in any other geometric shape, according to design choices. Such profile choices may also depend, at least in part, on material costs and other manufacturing considerations.

Referring now to FIG. 2F, the structure of an exemplary apparatus of the present teachings is shown. In this example, the dimensions given herein accommodate a specific sorting machine. Other dimensions are contemplated by the present teachings. With respect to the clip, in an exemplary configuration, the length 223 of the semi-rigid arm 165 (FIG. 2E) is about 20 mm from the lowest point of the mitre fillet 157 (FIG. 2E) to the level of the cavity 163 (FIG. 2E). The length 235 from the lowest point of the rigid arm 161 to the top of the bumper 229 is about 42.5 mm. The semi-rigid arm 165 forms an angle 227 of about 6° with the bumper 229. The edge 201 of the bumper 229 forms an angle 213 of about 27° with the top edge 207 of the bumper 229. This cutout can accommodate material reduction and/or geometric requirements of the sorting machine, for example. Other shapes and angles are contemplated by the present teachings. The length 219 from the edge 203 to an opposite edge of the semi-rigid arm 165 is about 45 mm, the length 221 from the edge 203 to an opposite edge of the rigid arm 161 is about 54.8 mm, and the length 237 from the edge 203 to the opposite edge of the bumper 229 is about 75 mm. The mitre filet 157 is shown in the cross section 209 as 2.5 mm in size. The angle 239 between the cutout edge 225 and the bottom edge of the upper part of the bumper 229 is about 27°, and the length 233 between the bottom edge of the upper part of the bumper 229 and the top edge of the upper part of the bumper 229 is about 18.7 mm. In embodiments that include a tab 150 (FIG. 2E), the distance between the top edge of the upper part of the bumper 229 and the bottom of the tab 150 (FIG. 2E) is about 25 mm-75 mm. In embodiments where an additional or alternative coupling feature, such as a set screw is included, the length 205 between the bottom edge of the rigid wall 161 and the height of the recess 215 to receive the set screw is about 12.7 mm, while the distance 221 between the recess 215 and the edge of the rigid wall 161 is about 31 mm. The diameter of the recess 215 is about 3.8 mm.

Figure 3A:
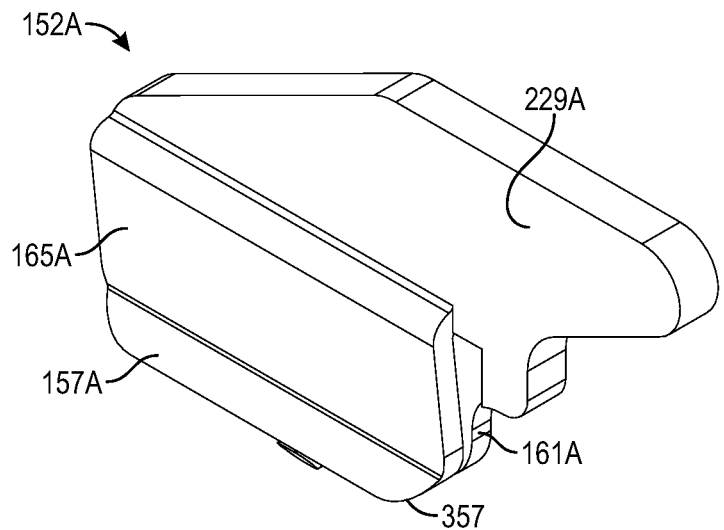
FIG. 3A shows a right side perspective view, a side view, and a front view of a second exemplary device, according to one or more implementations disclosed.
Figure 3A:
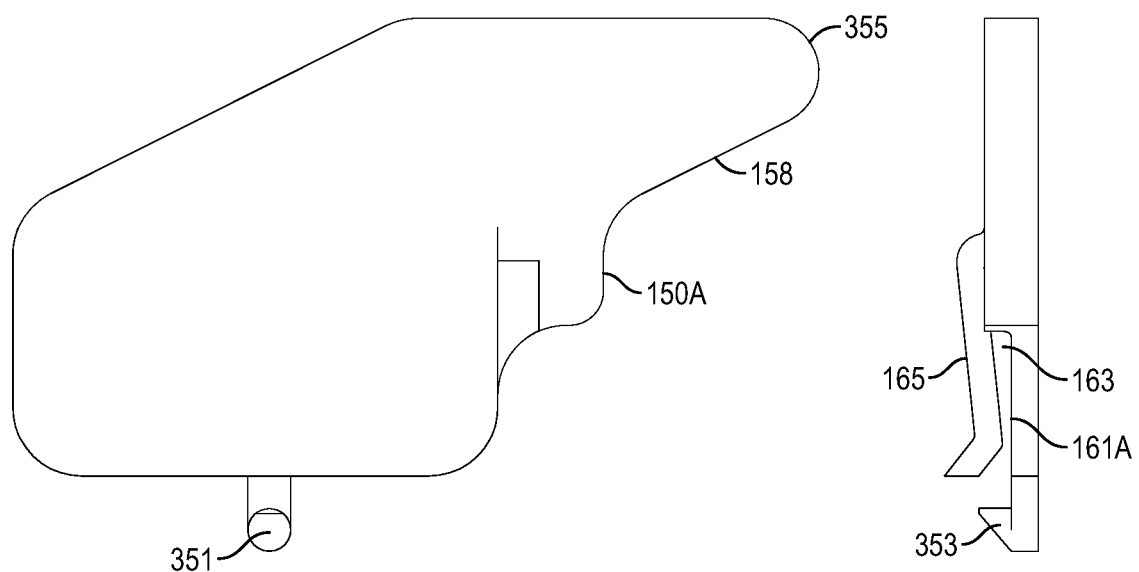
Figure 3B:
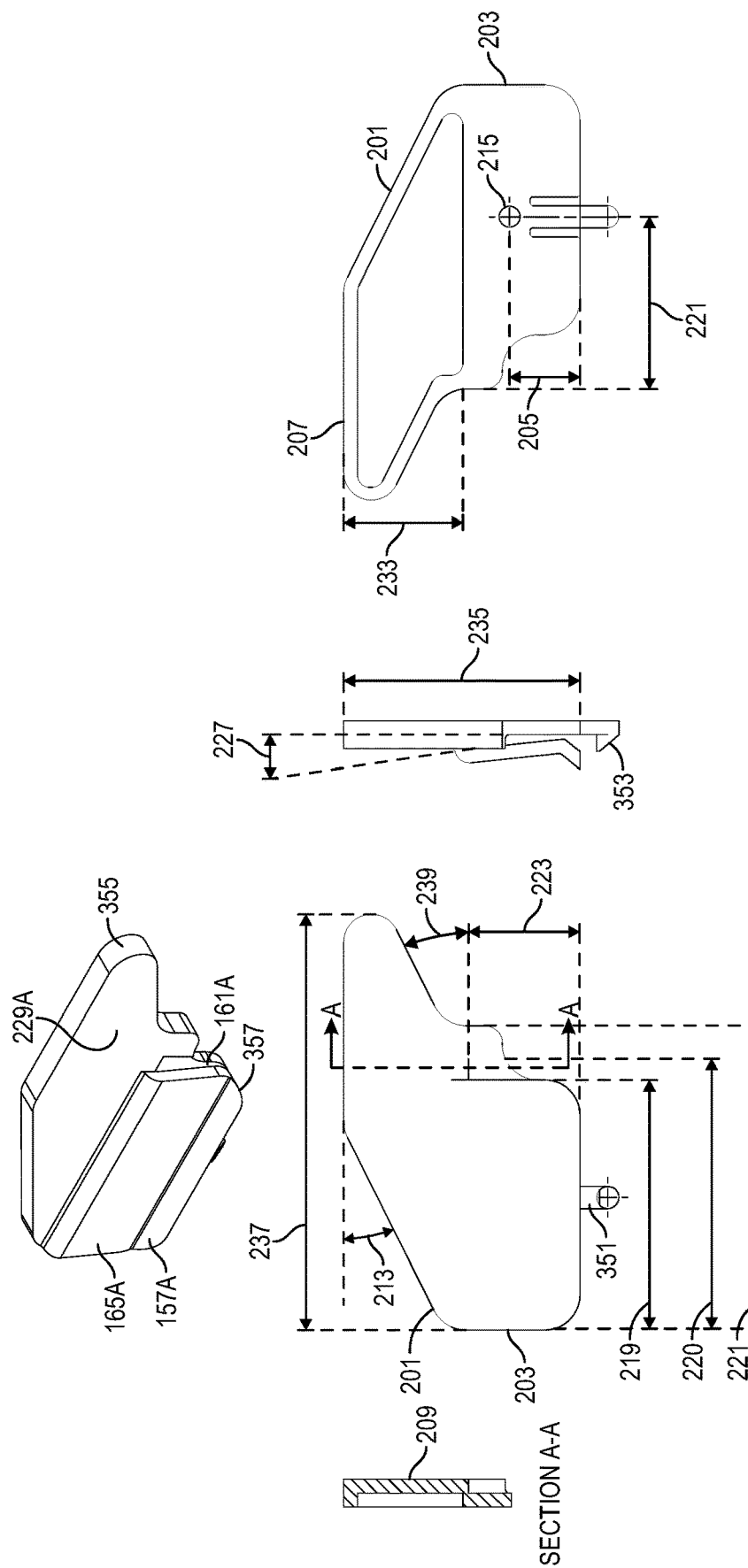
FIG. 3B shows a right side perspective view, and a front view of the second exemplary device with exemplary dimensions, according to one or more implementations disclosed.
Figure 3C:
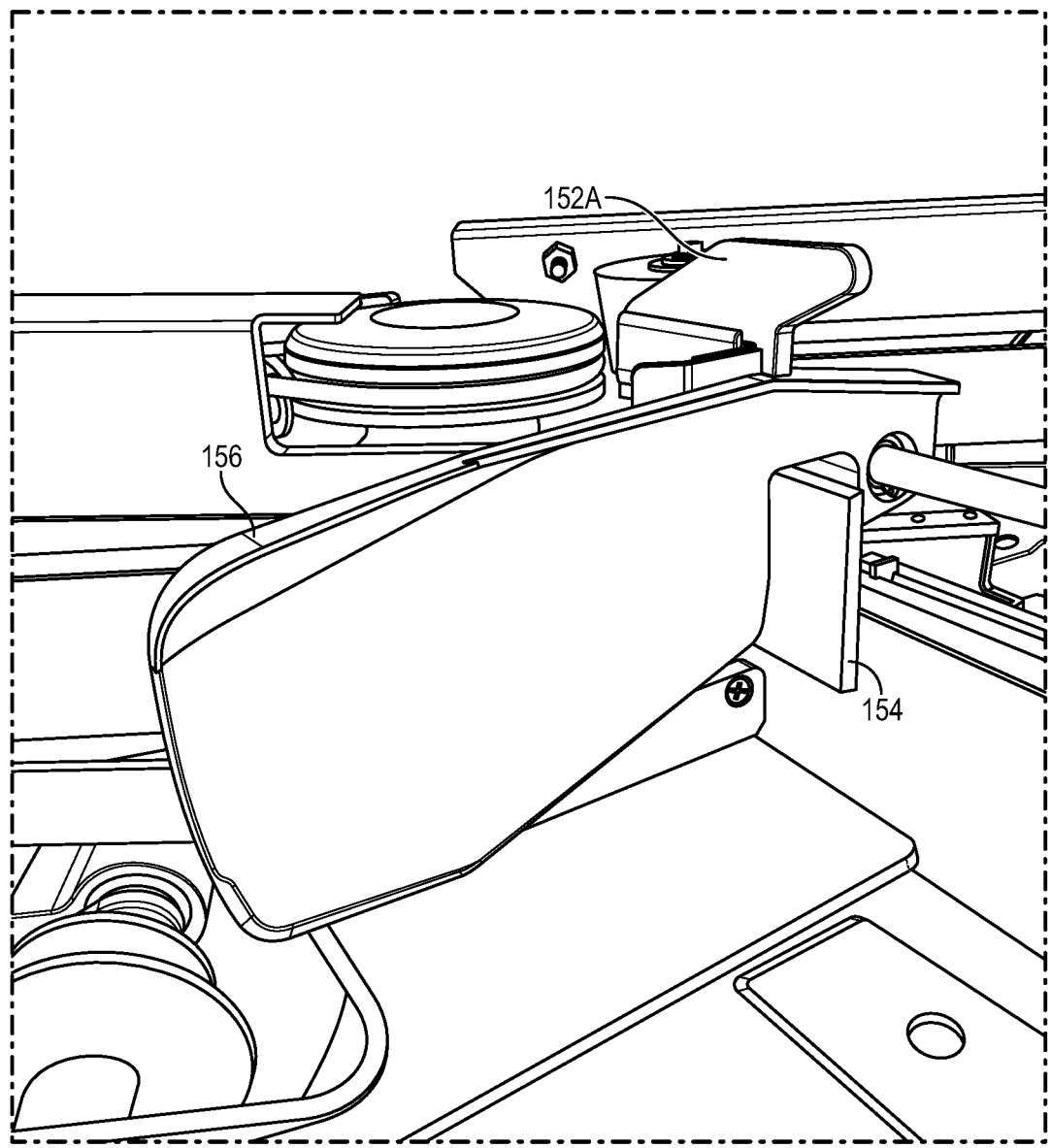
FIG. 3C is a right side perspective view of the second exemplary device, installed in the sorting machine of FIG. 1A, according to one or more implementations disclosed.
Figure 3D:
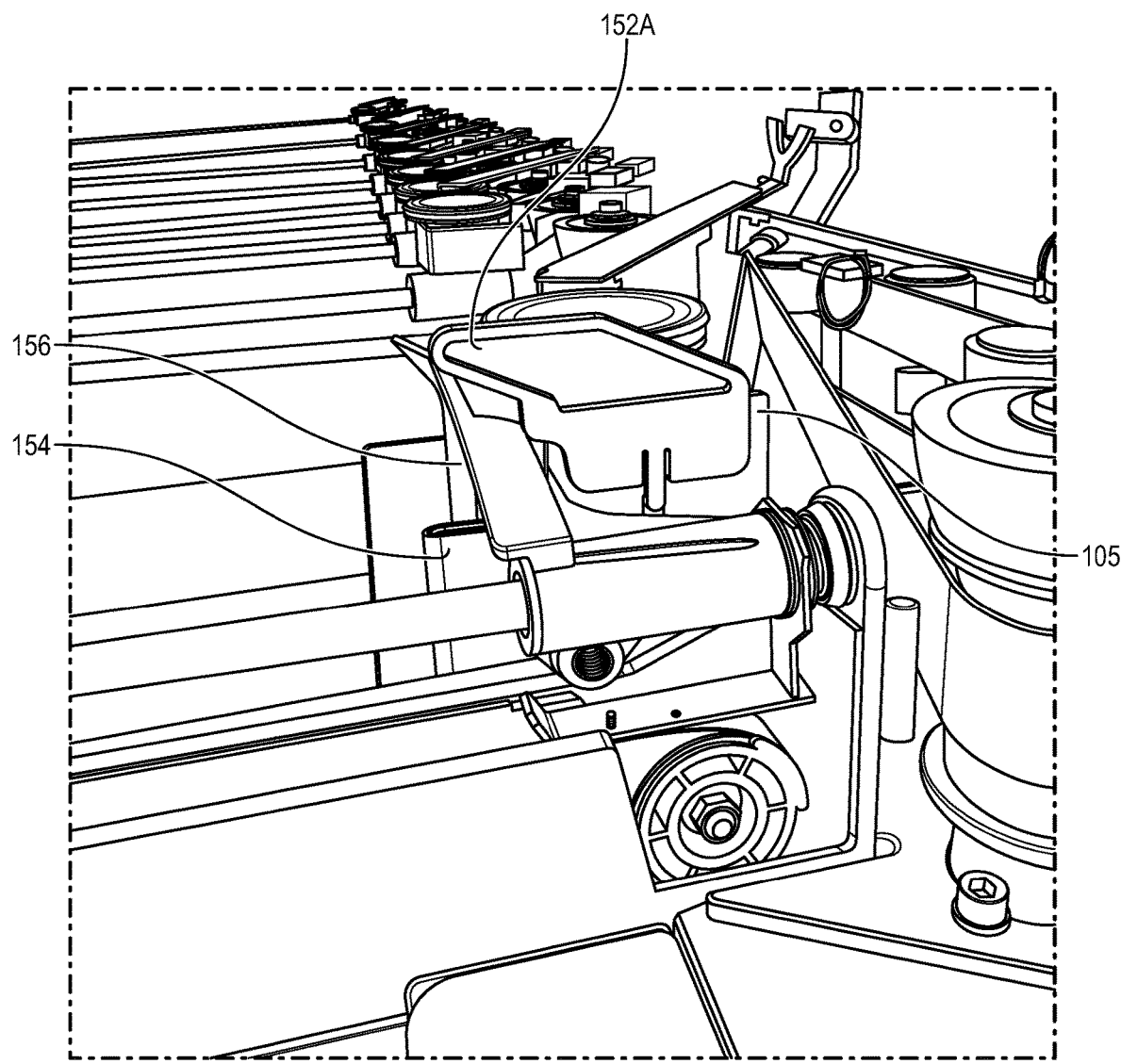
FIG. 3D is a left side view of the second exemplary device installed in the sorting machine of FIG. 1A, according to one or more implementations disclosed.
Figure 3E:
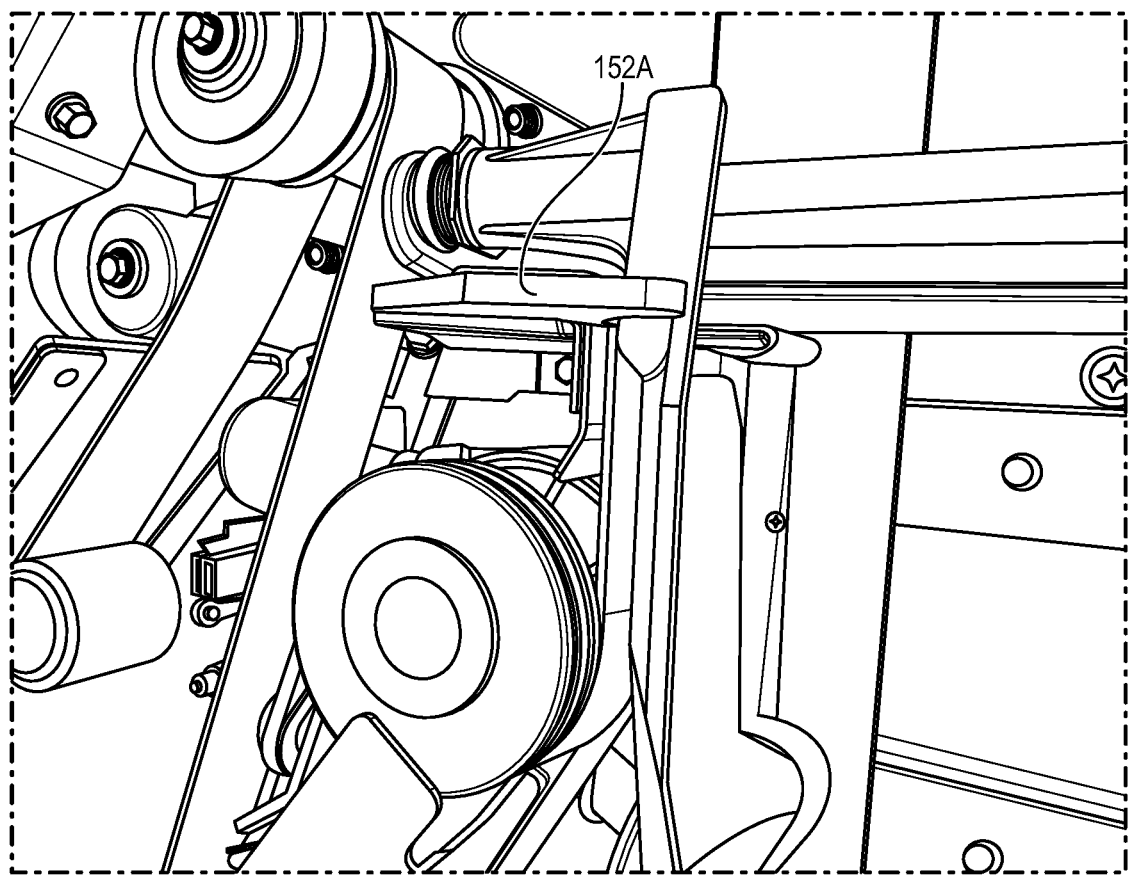
FIG. 3E is a front perspective view of the second exemplary device, installed in the sorting machine of FIG. 1A
Figure 4A:
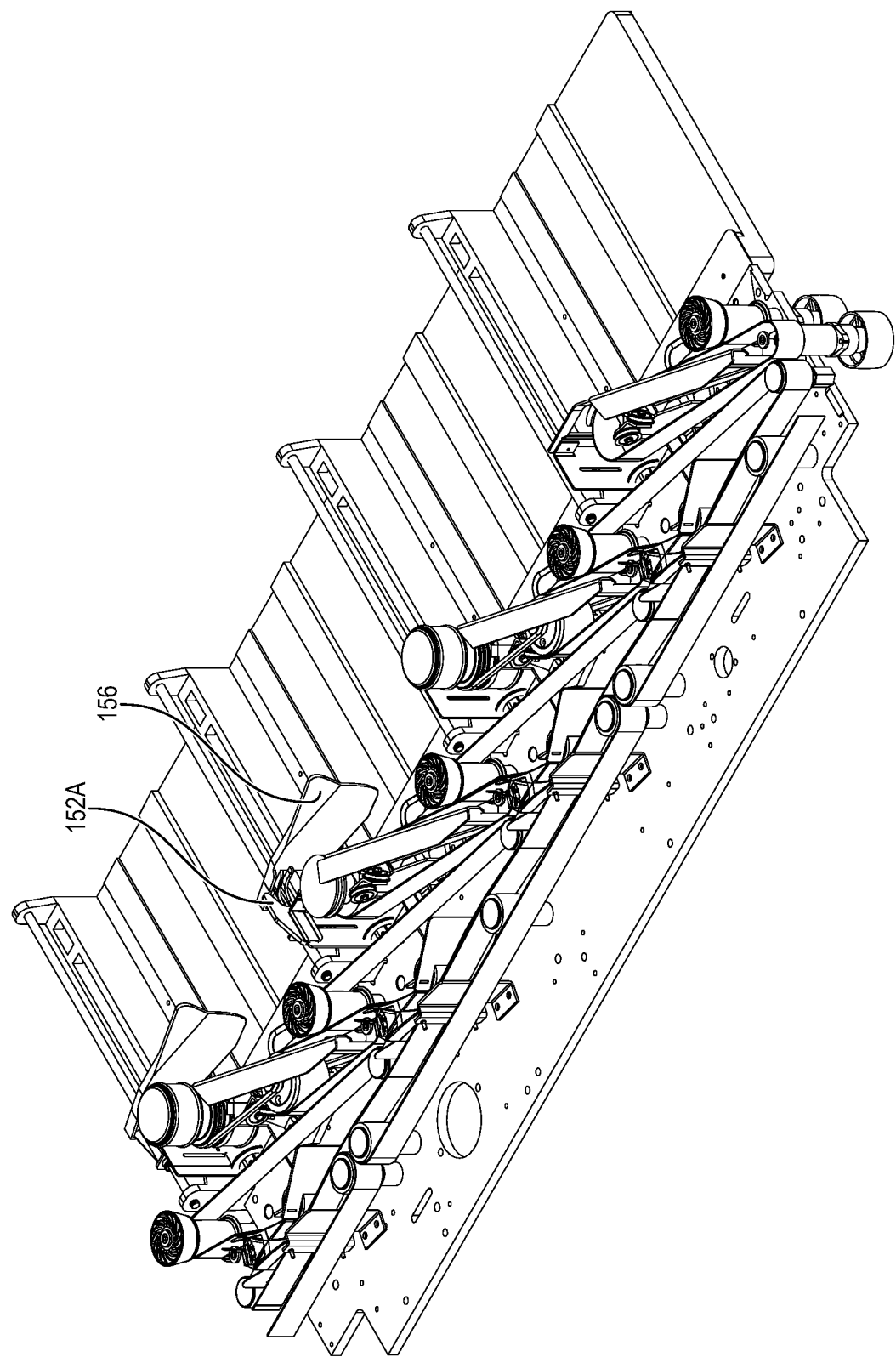
FIG. 4A is a right rear perspective view of an exemplary sorting machine having the second exemplary device installed, according to one or more implementations disclosed.
Figure 4B:
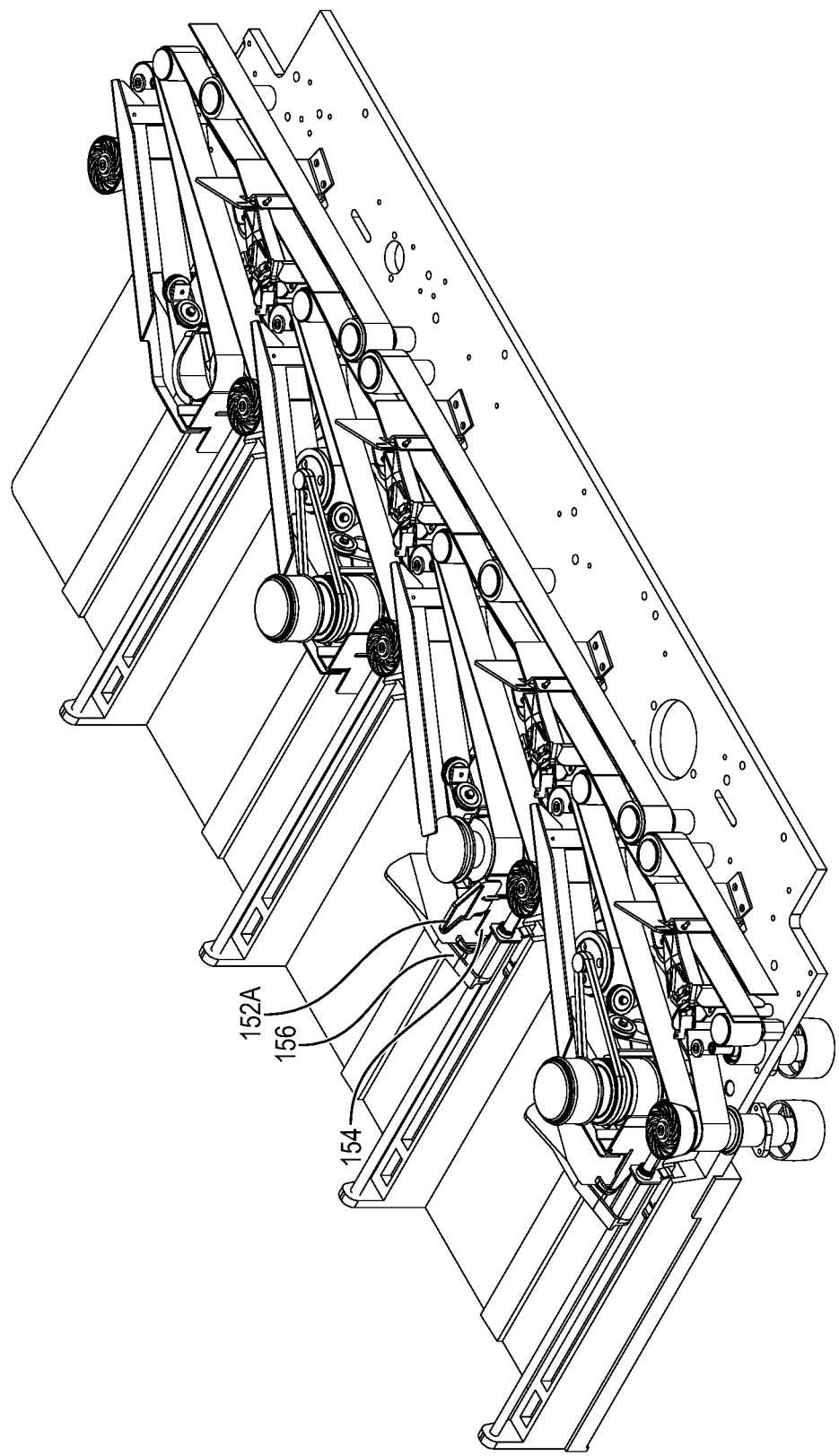
FIG. 4B is a left rear perspective view of an exemplary sorting machine having the second exemplary device installed, according to one or more implementations disclosed.
Figure 4C:
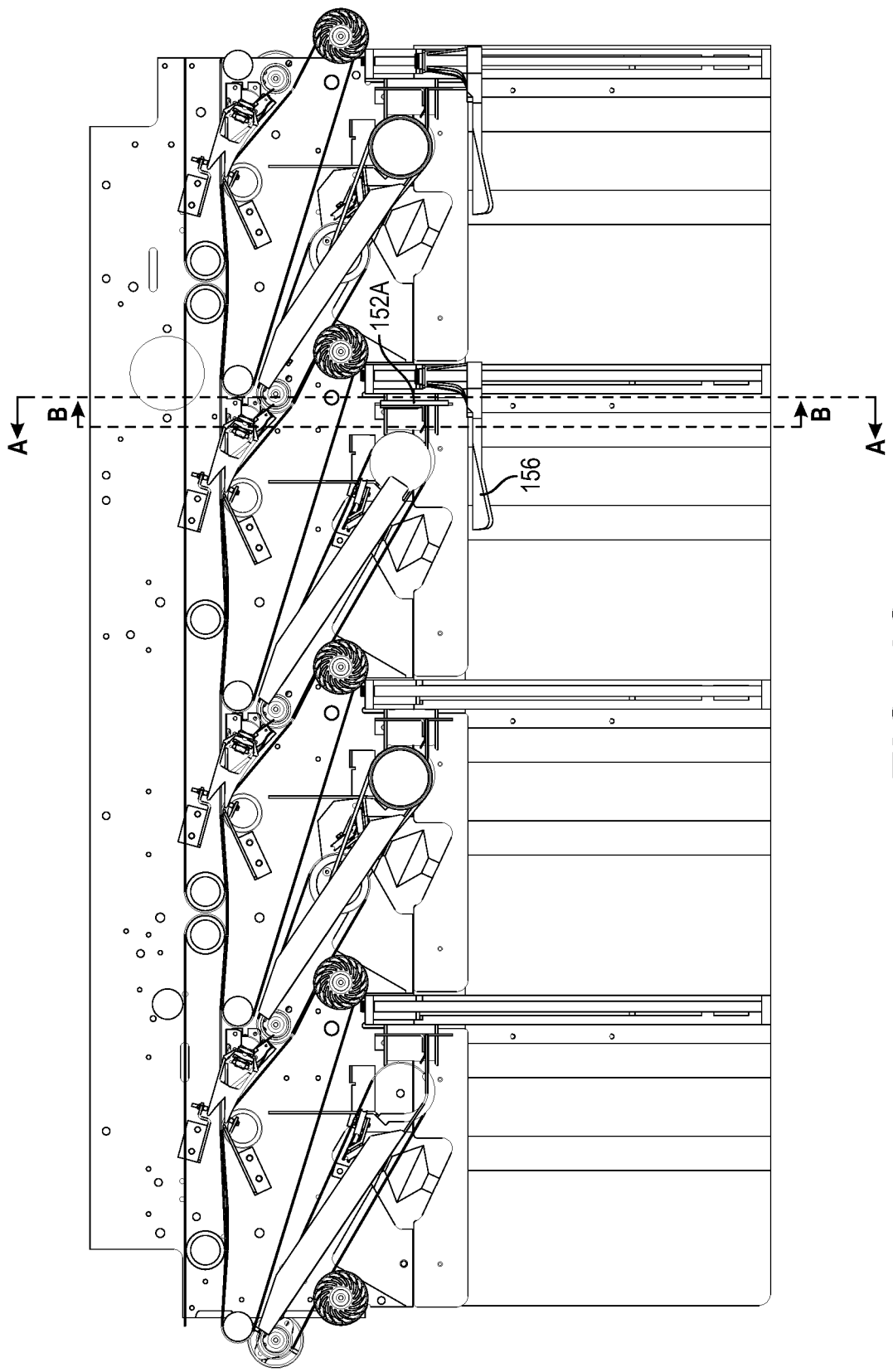
FIG. 4C is a plan view of an exemplary sorting machine having the second exemplary device installed, according to one or more implementations disclosed.
Figure 4D:
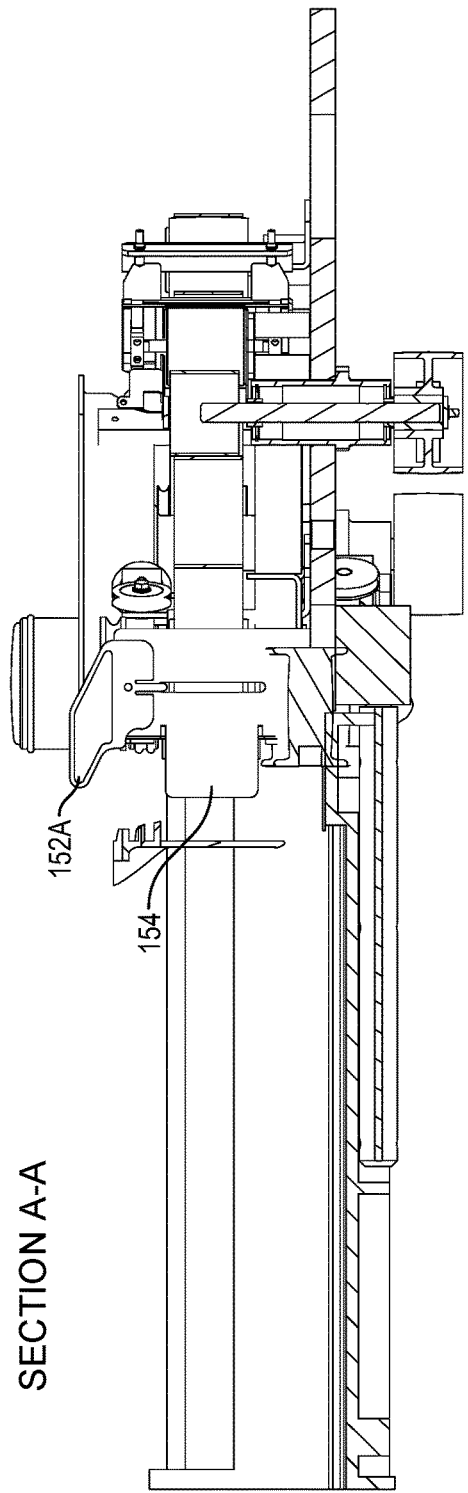
FIG. 4D is a cross section of a right side view of the second exemplary device installed in the sorting machine of FIG. 4C, according to one or more implementations disclosed.
Figure 4E:
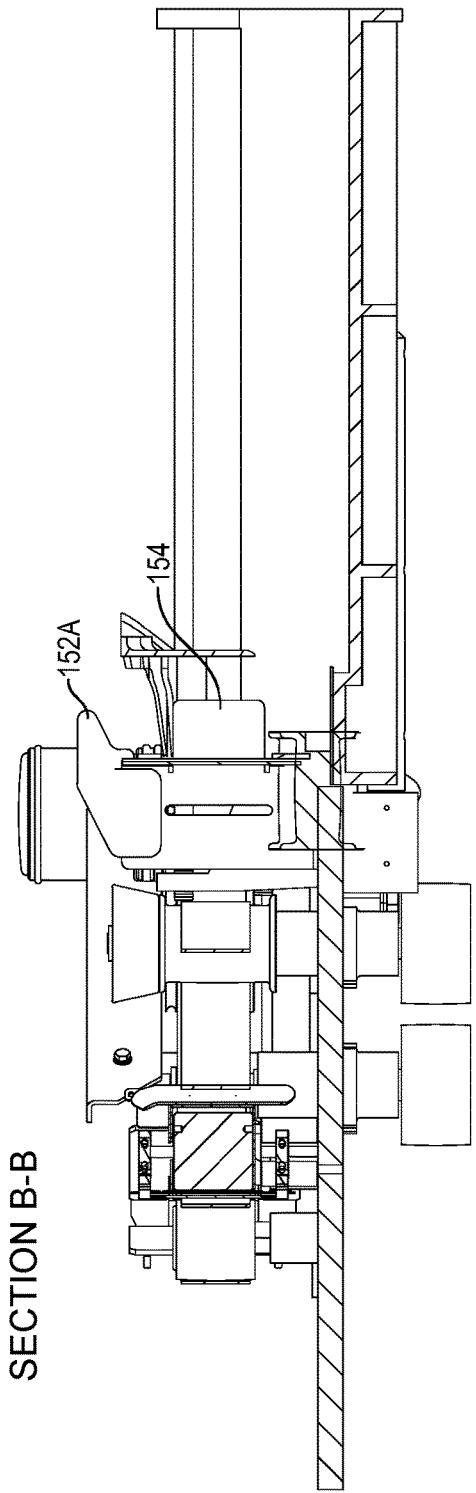
FIG. 4E is a cross section of a left side view of the second exemplary device installed in the sorting machine of FIG. 4C, according to one or more implementations disclosed.

Referring now to FIGS. 3A-3E, a second exemplary configuration of the apparatus 152A, is shown in isolation from a sorting machine (FIGS. 3A and 3B), and mounted in the sorting machine (FIGS. 3C-3E). FIG. 3B provides exemplary dimensions of the apparatus 152A of FIG. 3A. The apparatus 152A is similar to apparatus 152 (FIGS. 2A-2F) with some exceptions. The apparatus 152A includes rounded edges 355, 357 that can reduce the likelihood of displacement of the apparatus 152A due to mechanical forces on sharp corners inherent in the use of a machine with moving parts, traveling delivery items, and human activity. The apparatus 152A includes a foot 353 that can grasp the mounting feature and stabilize the position of the apparatus 152A, further preventing displacement. In some embodiments, the foot 353 can extend in an approximate perpendicular direction from the base of the rigid wall 161A by, for example, 1 mm-6 mm. The foot 353 can be angled at its base, forming a surface perpendicular to the rigid wall 161A. Other shapes of the foot 353 are contemplated by the present teachings. The apparatus 152A includes a finger 351 extending from the base of the apparatus 152A. The finger 351 is used to position the apparatus 152A upon the mounting feature and can be located anywhere on the face of the apparatus 152A. In some embodiments, the finger 351 is flexible, allowing its displacement with respect to the face of the apparatus 152A.

Referring now to FIGS. 4A-4E, the apparatus 152A is shown from different perspectives mounted in an exemplary sorting machine.

Figure 5A:
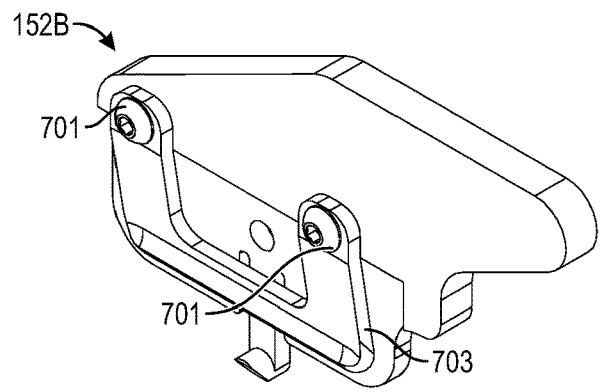
FIG. 5A is a right side perspective view of a third exemplary device, according to one or more implementations disclosed.
Figure 5B:
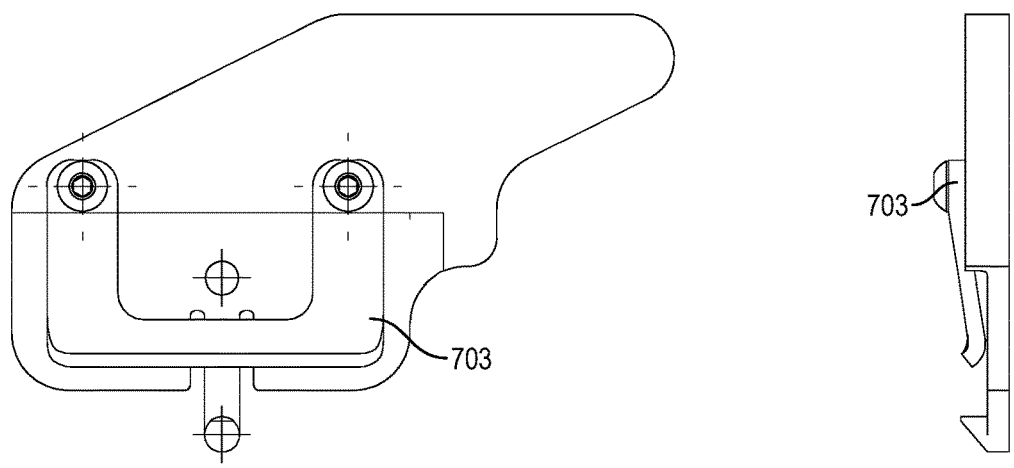
FIG. 5B are right side and front views of a third exemplary device, according to one or more implementations disclosed.
Figure 5C:
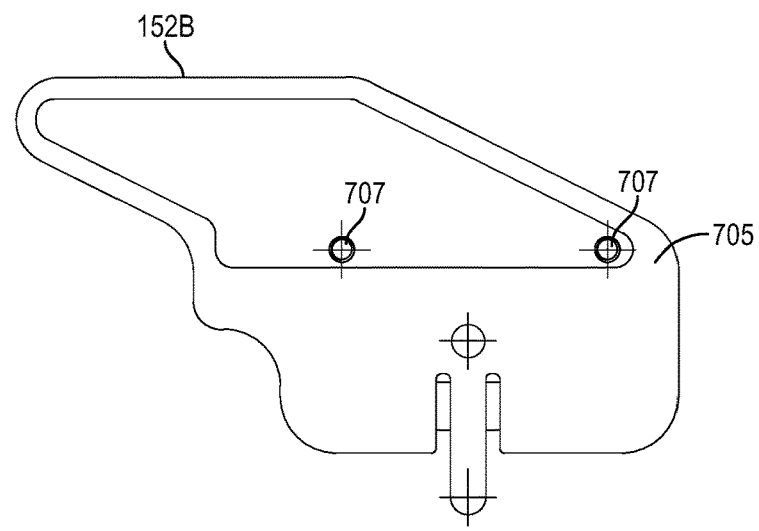
FIG. 5C is a right side view of a third exemplary device, according to one or more implementations disclosed.

Referring now to FIGS. 5A-5C, a third exemplary apparatus 152B is shown from various perspectives. The apparatus 152B includes most of the features of apparatus 152A, and additionally replaces the semi-rigid arm 165A (FIGS. 2A-2F) with a removable flap 703. In an embodiment, the removable flap 703 attaches to the rigid wall 705. The rigid wall 705 is configured to accommodate fastener(s) that couple the removable mounting feature 703 with the rigid wall 705. In an embodiment, the removable flap 703 hosts two screws at mounting points 701 that couple with fastener receiving points 707. Other forms the fasteners can take are, for example, but not limited to, glue, VELCRO®, staples, pins, rods, and elastic. In an embodiment, the removable flap 703 includes a plurality of arms for fastening the flap to the rigid wall. In an embodiment, the removable flap 703 is a continuous crosspiece hosting fastening options. Other geometries are contemplated for the removable flap 703.

Figure 6A:
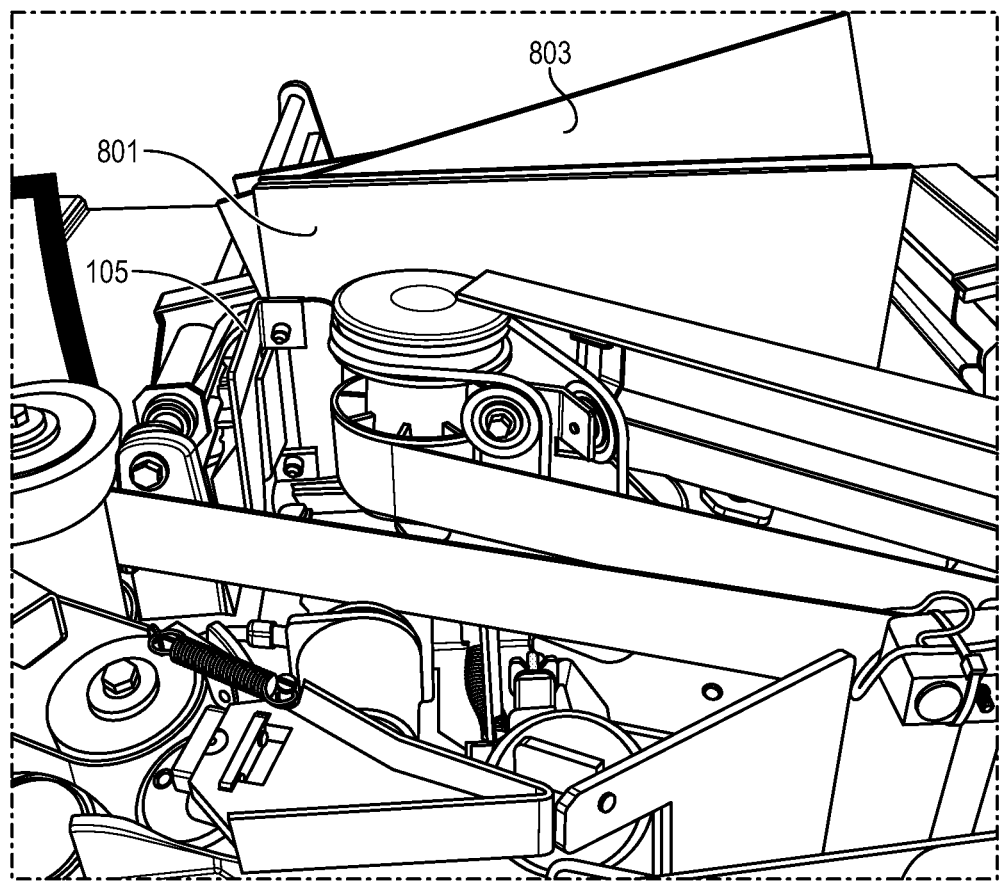
FIGS. 6A-6C are, respectively, a front view of a sorting machine including one output bin lacking an exemplary device, one output bin including an exemplary device, and items sorted into side-by-side output bins, according to one or more implementations disclosed.
Figure 6B:
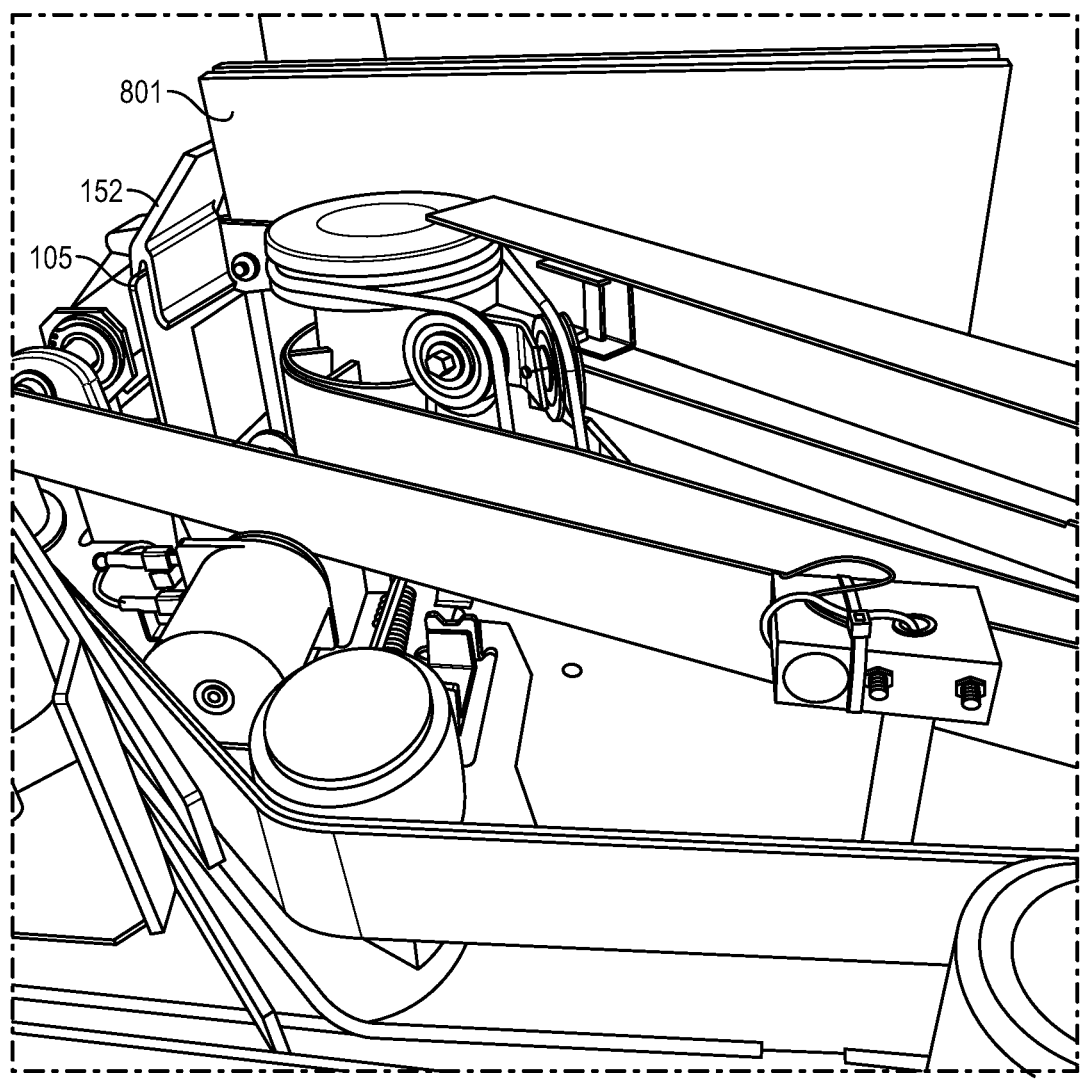
Figure 6C:
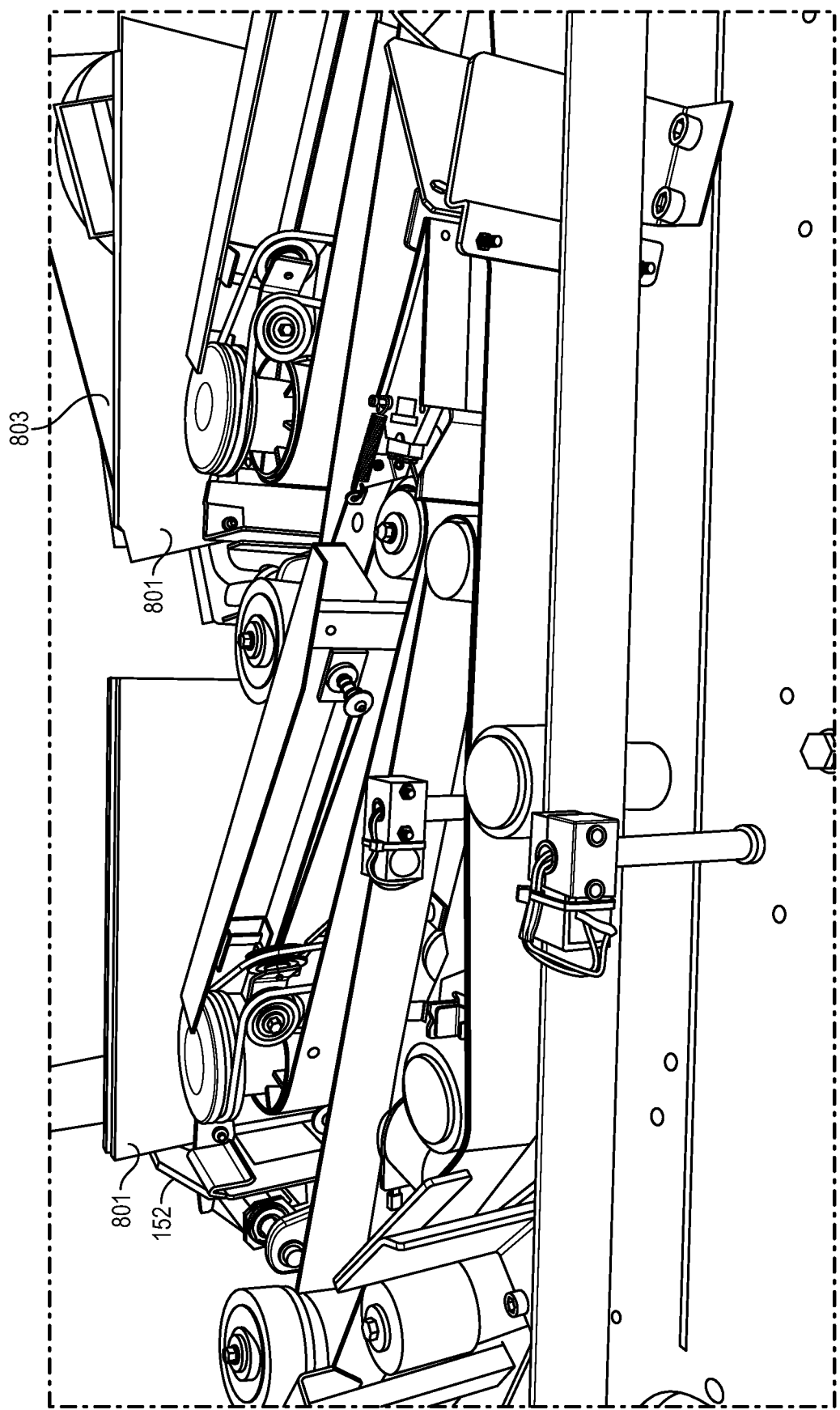

Referring now to FIGS. 6A-6C, delivery items 801/803 are shown in output bins of a sorting machine. FIG. 6A illustrates on output bin without the apparatus 152, while FIG. 6B illustrates an output bin with the apparatus 152 mounted upon, for example, conventional feature 105. FIG. 6C illustrates a side-by-side comparison of output bins configured with and without the apparatus 152. The apparatus 152 (left hand bin) stops the travel of the delivery items 801/803 that are taller than the conventional output bin boundaries shown on the right as they travel into the output bin. The right output bin shows that delivery item 803 has landed in the output bin in a skewed position with respect to the delivery item 801. The apparatus of the present teachings prevents such a skew, as in shown in the left output bin in which the delivery items 801/803 rest in the output bin against the apparatus 152 in such a way that the delivery item 803 is completely hidden behind delivery item 801.

The present disclosure has been described with reference to example implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

The foregoing description provides illustration and description, but is not intended to be exhaustive or to limit the possible implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A sorting machine apparatus for orienting a delivery item, the sorting machine apparatus comprising:
   a bumper; and
   a coupling feature connected to the bumper,
   wherein the coupling feature operably couples the sorting machine apparatus with a sorting machine such that the bumper is positioned to align with an upper portion of the delivery item, and
   wherein the coupling feature comprises a clip, and the clip comprises:
      a semi-rigid arm having a first end and a second end, the first end being substantially curved; and
      a rigid wall operably coupled with the semi-rigid arm at the first end.

2. The sorting machine apparatus of claim 1 wherein the bumper and the coupling feature comprise a single structure.

3. The sorting machine apparatus of claim 1 wherein the rigid wall comprises a lip.

4. The sorting machine apparatus of claim 1 wherein the semi-rigid arm comprises a mitre fillet.

5. The sorting machine apparatus of claim 1 wherein the coupling feature comprises a set screw.

6. The sorting machine apparatus of claim 1 comprising a metal material.

7. The sorting machine apparatus of claim 1 comprising a plastic material.

8. The sorting machine apparatus of claim 1, further comprising:
   a tab operably coupled with the bumper, the tab extending from a lower edge of the bumper.

9. The sorting machine apparatus of claim 1, wherein the bumper includes an angled feature that is configured to guide a paddle away from the sorting machine apparatus.

10. A delivery item sorting machine apparatus coupled with a delivery item sorting machine, the delivery item sorting machine including a series of belts configured to transport at least one delivery item past at least one diverter, the at least one diverter configured to sort the at least one delivery item into an output bin that collects sorted delivery items, the delivery item sorting machine apparatus comprising:
 a bumper configured with a spatial extension to the output bin; and
 a coupling feature operably securely coupling the bumper with the output bin,
 wherein the coupling feature comprises a clip, and the clip comprises:
  a semi-rigid arm having a first end and a second end, the first end being substantially curved; and
  a rigid wall operably coupled with the semi-rigid arm at the first end.

11. The delivery item sorting machine apparatus of claim 10 further comprising:
 a paddle operating cooperatively with the bumper, the paddle and the bumper bounding the at least one delivery item on two sides as the at least one delivery item is directed into the output bin.

12. The delivery item sorting machine apparatus of claim 10 further comprising:
 a backstop operably coupled with the output bin, wherein the coupling feature is configured to create a secure coupling between the bumper and the backstop.

13. The delivery item sorting machine apparatus of claim 10 wherein the rigid wall comprises:
 a lip extending towards the semi-rigid arm, the lip being configured to prevent the bumper from becoming disengaged from the output bin.

14. The delivery item sorting machine apparatus of claim 10 wherein the semi-rigid arm comprises:
 a fillet extending away from the rigid wall, the fillet configured to aid in installation and removal of the bumper.

15. The delivery item sorting machine apparatus of claim 10 wherein the spatial extension comprises:
 a height extension.

16. The delivery item sorting machine apparatus of claim 10 wherein the bumper comprises:
 a dampening pad configured to reduce a force transmitted as the at least one delivery item contacts the bumper.

17. The delivery item sorting machine apparatus of claim 10 wherein the coupling feature comprises:
 an accommodation for at least one of a bolt, a magnet, a rivet, a pin, an adhesive, or hook-and-eye material.

18. The delivery item sorting machine apparatus of claim 10, wherein the bumper includes an angled feature that is configured to guide a paddle away from the sorting machine apparatus.

19. The delivery item sorting machine apparatus of claim 10, wherein the rigid wall comprises a lip.

20. The delivery item sorting machine apparatus of claim 10, wherein the semi-rigid arm comprises a mitre fillet.

* * * * *